ary recovery of petroleum and has particular reference to improving the drive of oil-containing fluid located in heterogeneous formations.

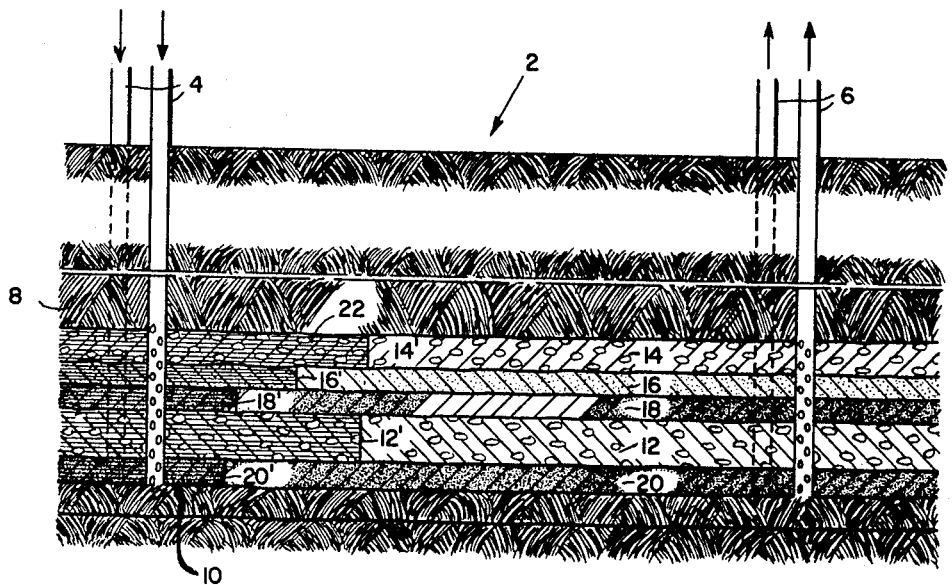

United States Patent Office 3,330,348
Patented July 11, 1967

3,330,348
SECONDARY RECOVERY OF PETROLEUM USING LPG-AQUEOUS LIQUID EMULSIONS
William C. Hardy and Billy W. McArthur, Richardson, Tex., assignors to Sun Oil Company, Philadelphia, Pa., a corporation of New Jersey
Filed Aug. 12, 1963, Ser. No. 301,297
1 Claim. (Cl. 166—10)

This invention relates to the secondary recovery of petroleum and has particular reference to improving the drive of oil-containing fluid located in heterogeneous formations.

So-called secondary recovery methods involve the drive of the oil-containing fluid (hereafter referred to as the driven fluid and containing petroleum oil and/or water and/or gases) from the reservoir rock into producing wells by driving fluids such as water or gas which are injected into the reservoir through injection wells, both types of wells being properly located within its extent. Many variations of such methods are known, sometimes involving the provision of slugs of various fluids between the driven fluid and the driving fluid.

The effectiveness of oil recovery by such methods depends upon many factors, but one which is quite important is the degree of heterogeneity of the reservoir rock. The heterogeneity of significance in connection with the present invention is that which may be most generally stated as involving stratification or lamination of the rock in the direction in which flow is desired, with the stratification involving layers varying quite considerably in permeability. The problem which is presented by this situation is easily evident: a layer of high permeability will offer low hydraulic resistance to flow of both the driven and the injected driving fluid, while a layer of low permeability will offer a high resistance to flow. If layers of these various types all contain oil, as is usual, the advance of material through the high permeability layers will be much greater than through the low permeability layers, resulting in premature breakthrough and arrival of injected fluid at the production wells. Once this occurs, further flow of driving fluid will ordinarily take place substantially only through the higher permeability layers, bypassing the low permeability layers which may well have had their oil content displaced only to a relatively small extent.

The condition detrimental to production which has just been outlined has been recognized in the art, and attempts have been made to shut off or plug the high permeability layers at either or both of the injection and producing wells. It can be readily seen that such a procedure is, at best, only effective to a quite limited degree. While stratification usually produces a condition of higher permeability in directions parallel to the stratification as compared with directions transverse thereto, the vast extent of area existing in a usual oil reservoir provides "leakage" of flow from low permeability layers to adjacent high permeability layers through their interfaces, so that, in effect, while streamlines of flow may start out from an injection well along a low permeability layer (adjacent high permeability layers being blocked off) they will gradually deviate through boundaries into higher permeability layers and proceed, preferentially, therealong, with the result that again the flow which takes place will be largely through the layers of higher permeability, with little or no flow through major regions of the low permeability layers.

In accordance with the present invention the adverse conditions are rectified by the provision in the vicinity of one or more injection wells of a viscous mobile slug which will form a boundary between the driven fluid and the driving fluid. As will appear hereafter, this slug will have greater extent in the direction of flow within the more permeable layers than in the less permeable layers. The viscosity of the slug offers frictional resistance to flow, to overcome which a substantial pressure gradient is necessary. The resistance offered is an increasing function with the extent of the slug in the direction of flow. Once the slug is set up, therefore, a given pressure gradient between the injection wells and the production wells will result in a more nearly equal rate of displacement in the layers of different permeabilities. Thus a more uniform sweep of all of the permeable layers is produced, resulting in a higher overall removal of the desired oil from the reservoir.

The objects of the invention have to do with the effective drive of petroleum from layers of different permeabilities, and these will become more evident from consideration of the following description of the process with reference to the accompanying drawing in which the figure is a highly conventionalized diagram of a vertical section of an oil reservoir taken between injection and production wells.

The reservoir is generally indicated at 2. A plurality of injection wells are indicated at 4, and a plurality of production wells at 6. As is usual, multiple wells are thus provided strategically located in accordance with knowledge of the reservoir dimensions and characteristics in order to provide most effective removal of oil. While, as will be evident to those skilled in the art, the reservoir may be of any one of many types, it may be assumed for simplicity in describing the invention that a layer 8 of relatively impervious rock overlies the strata which bear oil. It may also be assumed that the oil-bearing strata are located above another relatively impervious rock layer 10. Between these boundaries, there are, frequently, fairly well defined layers which may differ very considerably in permeability in the direction from the injection wells to the producing wells. These layers may, of course, slope or have various curvatures, but, commonly, they lie generally parallel to each other, and are conventionalized in the figure as extending generally horizontally. Some of the layers may be discontinuous; i.e., they may terminate or begin at various locations as viewed in the direction of flow.

Of the layers illustrated, those at 12 and 14 may be considered layers of relatively high permeability in the direction of their extent; layer 16 may be considered as of intermediate permeability; and layers 18 and 20 may be considered as having relatively low permeability. All of these layers will generally contain oil, possibly together with water and gas, and the desired results is that of driving their fluid contents from the location of the injection wells towards the producing wells. Considering the figure to the extent so far described, there may be readily visualized what would occur in accordance with conventional practices utilizing water or gas as the injected fluid, or utilizing additionally between the driving and driven fluids conventional slugs such as those of the so-called "miscible" type. Flow would occur so preferentially in the layers such as 12 and 14 that rapid displacement would occur therein as compared with such layers as 18 and 20. Thus these layers 12 and 14 of high permeability would be swept out and the driving fluid would reach through them the production wells long before even partial sweep through the low permeability layers would occur. Once a breakthrough of the driving fluid to the producing wells occurred, the effectiveness of the recovery process would be severely impaired. The remaining oil in the low permeability layers would then be recoverable less profitably or economically.

In accordance with the present invention, a viscous fluid, of types hereafter more fully described, is introduced under pressure through the injection wells 4; or, alternatively, is formed in the formations by introduction of an injected fluid composition which, as injected, may not have the desired viscous properties. This fluid, shown in the condition following its injection or formation, is indicated by the horizontally shaded region designated 22.

First, let it be assumed that the viscous fluid or the fluid composition giving rise to it is introduced through the injection wells without the exercise of special control, the fluid flowing into the strata through conventional perforations in the casings of the wells. As this fluid enters the various layers, it will obviously meet with less resistance to flow in the high permeability layers with the result that, as injection proceeds, it will, at any time, radiate substantially further from the injection wells in the more permeable strata as compared with the less permeable strata. Ultimately, the injected or produced viscous fluid will inundate a region around the injection wells reaching, in the respective layers, the varying boundaries shown at 12', 14', 16', 18' and 20'. At the end of this injection, it is generally desirable to have the slug volume of the order of 0.5% to 10% of the volume of oil-bearing fluid which is estimated to be in place in the reservoir. This quantity, however, is subject to extreme variation depending upon the nature of the formations as determined by coring in the drilling of the various wells in the reservoir and from data derived as the result of primary production. All of the physical characteristics of the reservoir, including dimensions, must be taken into account to ascertain the proper amount of viscous fluid to be injected or formed. From such knowledge good estimates of what should be done may be made considering the theoretical aspects of what is to occur as will now be described.

Following the injection or formation of the viscous fluid, this will become a slug separating the driving fluid from the driven fluid throughout the cross-section of the flow pattern, and will accordingly be hereafter referred to as a viscous slug.

The driving fluid is now introduced under pressure and at the desired rate or rates through the injection wells.

Consider, now, the pressure conditions which will exist. Assume that the pressures at the injection wells are the same, though this, of course, need not be the case since deductions from the known existing conditions may indicate that the pressures should differ. Also assume, for simplicity, that the pressures existing at the producing wells are the same.

Consider, now, the conditions existing in a high permeability layer such as 12. As already indicated, the viscous slug will extend to a greater extent in the direction of flow in this layer as compared with layers of lower permeability, this being the result merely of injection of the slug-forming material. The overall pressure gradient between the injection wells and the producing wells in this layer 12 will be made up of gradients comprising, first, that across the unswept region of this layer between the boundary 12' and the producing wells, and, secondly, that between the injection wells and the boundary 12'. The former of these gradients will depend upon the velocity (volumetric) of displacement, the extent of its region in the direction of flow, the viscosity of the fluid in the unswept region, and the permeability of the layer 12. In the case of the portion of the slug in this same layer, the gradient between the injection wells and the boundary 12' is similarly dependent upon such matters, the velocity (volumetric) being the same and the permeability of the layer 12 being the same, but the viscosity of the slug material and the extent in the direction of flow being different. Since the velocity of flow at any point is a function of the pressure gradient, it will be evident that, as the slug has a greater extent in the direction of flow, the resulting pressure gradient moving the in situ fluid will be less so that for a given overall gradient the production rate through the well 6 from this layer will be less.

Consider next the low permeability layer such as 20. The viscosity of the in situ fluid is here the same as in the layer 12, but the permeability is less. The viscosity of the slug material in this layer is also the same as that of the same material in the more permeable layer. But because of the less horizontal extent of the slug material, the pressure drop tending to move the in situ fluid through the layer 20 may be much greater than in the more permeable layer.

Remembering that the initial penetration of the slug material as it was put in place was dependent upon similar pressure and volumetric velocity aspects, it will be evident that an automatic adjustment will have occurred to the end that, to a fair approximation, when driving fluid is now injected the volumetric displacement velocities in the various layers are more or less equalized, to the end that the slug will travel substantially as a unit, more or less maintaining its volumes in the respective layers, and driving the in situ fluid ahead of it toward the production wells much as if a rigid piston was operating through all of the layers simultaneously. Thus a more uniform sweep of the permeable layers occurs, with much improved condition of uniformity of removal of the desired fluid.

It may also be noted that the situation is to a considerable extent self-adjusting. Suppose, for example, that somehow the slug in the layer 20 was initially, or became later, too extended in the direction of flow so as to offer so much resistance that displacement of the fluid in the layer 20 lagged behind that in the layer 12. The slug material in the latter layer would then advance more rapidly, tending to outdistance the slug in the layer 20. But as soon as this occurred, the "leakage" between layers would take place, and the viscous slug material would pass into the layer 12 following the slug material of the latter, so that the slug material in the layer 20 would be decreased in volume, with the resulting offering by it of less resistance to flow, with an accompanying increase of rate of displacement in the layer 20. In effect, therefore, the "piston" provided by the viscous slug is more or less automatically adjusted in its configuration, always in a sense to tend to maintain equalization of displacement rates in the various layers. This automatic readjustment will also occur if the layers vary in relative thicknesses.

What has been described is obviously rather conventionalized for simplicity of consideration. Displacements and displacement rates have been treated as if they occurred essentially only along lines between the injection and producing wells. Obviously, the flow conditions are two-dimensional in the layers and the boundaries are not well-defined, though definition is usually reasonably sharp. But it will be evident, without further elaboration, that what has been described is more generally true for this two-dimensional type of flow. The boundaries between the slug and the driven fluid, and between the slug and the driving fluid, though curved, and varying with the progress of the drive, will, generally, conform to the desired conditions in which the slug as a whole, varying in its shape, will act essentially as a piston to drive the driven fluid uniformly through the various layers. As viewed from above the slug would appear as an annulus having rather irregular boundaries expanding outwardly with the drive and bulging towards the production wells, i.e. in the direction of freer flow. With its outward expansion its width would decrease, maintaining, however, substantial equalization of flows in the various layers by the actions already described.

In the foregoing discussion it was pointed out that generally the varying permeabilities of the layers would result in the introduction of slug material (i.e., the ultimate viscous material of the slug or the material giving rise to the viscous slug) variably thereto in conformity with what is desired, even though no control of introduction of the slug material at various levels was effected. However, where observed conditions would seem to warrant, the slug material may be differentially injected into various layers by the use of packers in fashions well known in this art for injection of fluids where desired. By the use of packers, injection of the slug material may be cut off from the less permeable layers for selective major introduction into the more permeable layers, and proportioning of the amount of slug material introduced into the layers may be thus controlled. The initial volumetric shape of the slug may thereby be made whatever seems desirable to the operator. In a highly permeable layer, for example, it may be desirable to introduce a much greater amount of the slug material than would proportionately go thereinto merely by uncontrolled injection into all of the layers.

The nature of the viscous slug material provided in accordance with this invention may vary considerably but is characterized by its formation as an emulsified slug. The emulsified slug is a preformed emulsion of two liquids.

The emulsion is desirably introduced in a volumetric amount estimated to be 0.5% to 10% of the oil in place in the reservoir. The introduction may be either controlled selectively to the various strata by packers or the introduction may be uncontrolled, as brought out above, to permit the portions entering the various layers of strata to do so in amounts automatically controlled by the permeability of the layers.

The liquid emulsion thus provided may be either of oil-in-water type or water-in-oil type, either being effective.

In the case of either type of emulsion, the emulsion may be provided in any of the well-known conventional fashions and these need not be detailed. For example, homogenization may be effected by high velocity flow of a mixture of the liquids and an emulsifying agent under high pressures through restricted passages; or the emulsification may be effected by the use of supersonic vibrations or by mechanical vibrations creating intense turbulence in any desired fashion.

While not essential, increase of effective viscosity of the slug material may be achieved by increasing the viscosity of the liquid forming the continuous phase. In the case of a water-in-oil emulsion, the oil may be of naturally high viscosity type, or a less viscous oil may have its viscosity increased by the addition of such materials as olefin polymers, soaps, still bottoms, or high viscosity crude oil.

In the case of oil-in-water emulsions, the aqueous phase may have its viscosity increased by the incorporation of carboxy methyl cellulose or other gel-forming or viscosity-producing materials such as sodium lauryl beta-aminopropionate, hydrolyzed polyacrylamide having 12 to 45 percent of the original carboxamide groups hydrolyzed to carboxyl groups, polysaccharide gums, agar, d-galactopyranose residues attached by 1,3 glycosidic linkages, algin-polyurenic acid, or carrageenin-polysaccharides of d-galacto pyranose and 1-galactose units, 2-ketogluconic acid units and nonreducing sugar units, each unit the size of a hexose and combined with one sulfate radical.

In the case of either type of emulsion, suitable emulsifying agents may be used corresponding to the type of emulsion desired. Conditions for emulsification of the two types are well known and need not be elaborated here. For example, organic acid-additive salts of N-higher alkyl substituted alkylenepolyamines may be used for the formation of oil-in-water emulsions. Numerous other well-known emulsifying agents may be used. In the case of oil-in-water emulsions typical emulsifying agents may be polyoxyethylene sorbitol monostearate, polyoxyethylene sorbitol monopalmitate, polyoxyethylene sorbitol monooleate, polyoxyethylene stearate, polyoxyethylene oxypropylene stearate, polyoxyethylene lauryl alcohol, polyoxyethylene cetyl alcohol, polyoxyethylene stearyl alcohol, polyoxyethylene oleyl alcohol, acid stable glyceryl monostearate, or alkyl aryl sulfonate.

The emulsifying agents used to produce water-in-oil emulsions may be, for example, sorbitan sesquioleate, sorbitan monooleate, sorbitan trioleate, sorbitan monostearate, sorbitan tristearate, sorbitan monopalmitate, sorbitan monolaurate, glyceryl monostearate, or glyceryl monooleate.

As the continuous phase of a water-in-oil emulsion, there may be used liquefied petroleum gas containing a viscosity-increasing material, and the advantages of the invention already described may be achieved with the additional advantage of providing a miscible slug with its known result of effecting a more complete removal of the desired petroleum content under gas drive. Whatever the type of slug used, the drive may be either by gas or by water, but gas drive is desirable when a miscible slug is used.

It will be evident that a combined water and gas drive may be used. In the case of a miscible slug gas may be first introduced as the driving material, followed by water.

The effective viscosity of the slug of emulsion is, in accordance with the invention, not so much due to the actual viscosity of the continuous phase as to the so-called Jamin effect. The Jamin effect is due to the resistance to flow produced by the material forming the discontinuous phase which, in a sense, blocks the pores of the formation so that the slug material, viewed as a whole, has an apparent high viscosity exceeding that of the fluids in the reservoir. As already stated, the viscosity may be further increased by actual increase of viscosity of the continuous phase. The apparent viscosity is desirably at least twenty percent greater than that of the oil in the formation.

Emulsions are advantageous in that they exhibit the properties of a dilatent material, i.e. one which has the characteristic of exhibiting an increase in viscosity during intense agitation. A more accurate statement would be that the shear forces increase with shear rate, the behavior being different from that of a thixotropic material which exhibits an increase in shear forces with a decrease in shear rate.

The high velocity channels will thus create a higher hydraulic resistance in the case of emulsions, as is desirable in the case of a mobile slug of the type herein considered. If flow in a channel ceased completely or became quite slow, the emulsion would have a tendency to break reducing the hydraulic resistance and thereby reestablishing flow.

Thus, a wide range of viscosities may be made available for use in accordance with the results desired. What should be used will generally be determined by preliminary tests of flow conditions using samples of porous materials corresponding to those secured by coring of the formations. As is well known, deductions as to flow conditions may be made by taking into consideration previous history of the particular reservoir being operated. The deductions are made from pressure and flow measurements, composition of produced fluids, etc. The engineers in charge of operations may thus make their best estimates as to the desired properties of a slug to be used for driving purposes.

It will be evident that numerous variations in procedure may be adopted depending upon conditions observed, and the invention is accordingly not to be considered as limited except as required by the following claim.

What is claimed is:

The secondary recovery method for petroleum-containing fluid from a reservoir containing said fluid in layered formations of varying permeabilities which includes:

introducing through at least one injection well into said reservoir materials to produce in the reservoir a slug having the form of an emulsion with a liquid continuous phase of liquefied petroleum gas and an aqueous discontinuous phase, the slug having a higher effective viscosity than the petroleum-containing fluid in the reservoir and varying in penetration with said formations; and
then providing a fluid drive through said injection well to advance said slug to drive before it the petroleum-containing fluid towards at least one producing well.

References Cited
UNITED STATES PATENTS

| | | | |
|---|---|---|---|
| 2,771,138 | 11/1956 | Beeson | 166—9 |
| 2,827,964 | 3/1958 | Sandiford et al. | 166—9 |
| 2,988,142 | 6/1961 | Maly | 166—9 |
| 3,074,481 | 1/1963 | Habermann | 166—9 X |
| 3,149,669 | 9/1964 | Binder et al. | 166—9 |
| 3,208,515 | 9/1965 | Meadors et al. | 166—9 |
| 3,208,517 | 9/1965 | Binder et al. | 166—9 |

OTHER REFERENCES

Becher: Emulsions: Theory and Practices, Reinhold Publishing Corp., N.Y. (1957), pages 338, 339, 341–346, 350–354, 356 and 358–360.

CHARLES E. O'CONNELL, *Primary Examiner.*

S. J. NOVOSAD, *Assistant Examiner.*